(12) United States Patent
Rawdon

(10) Patent No.: US 7,467,783 B2
(45) Date of Patent: Dec. 23, 2008

(54) TENSIONING APPARATUS AND METHOD

(75) Inventor: Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/689,263

(22) Filed: Mar. 21, 2007

(65) Prior Publication Data

US 2008/0229688 A1 Sep. 25, 2008

(51) Int. Cl.
*B66D 3/04* (2006.01)
(52) U.S. Cl. .................. 254/391; 254/411; 254/412
(58) Field of Classification Search .............. 254/391, 254/405, 411, 413
See application file for complete search history.

(56) References Cited

U.S. PATENT DOCUMENTS

| | | | | |
|---|---|---|---|---|
| 2,647,943 | A | * | 8/1953 | Kreisler ............... 174/207 |
| 2,827,680 | A | * | 3/1958 | Gibson ................ 403/211 |
| 3,756,565 | A | * | 9/1973 | Sakai ................. 254/391 |
| 4,052,026 | A | | 10/1977 | Wood |
| 4,398,336 | A | | 8/1983 | Beuch |
| 4,452,430 | A | * | 6/1984 | Kankkunen ............ 254/391 |
| 5,016,026 | A | | 5/1991 | Flory |
| 5,647,198 | A | | 7/1997 | Mihailovic |
| 6,481,695 | B1 | * | 11/2002 | Fuller ................. 254/405 |
| 6,578,329 | B1 | | 6/2003 | Stubler et al. |
| 7,313,975 | B1 | * | 1/2008 | Scorteanu ............ 73/862.454 |
| 2004/0154876 | A1 | * | 8/2004 | Choi .................... 187/412 |

FOREIGN PATENT DOCUMENTS

GB          2 434 161 A          7/2007

OTHER PUBLICATIONS

"Rama 8 Bridge", Buckland & Taylor Ltd., Bridge Engineering, 1 page, Available at http://www.b-t.com/projects/rama8.html.
"Z-System PBO Rigging", Seahorse International Sailing Magazine, Issue 323, Jan. 2007.

* cited by examiner

*Primary Examiner*—Emmanuel M Marcelo
(74) *Attorney, Agent, or Firm*—Harness, Dickey & Pierce, P.L.C.

(57) ABSTRACT

A system and method for tensioning a cable. A thimble is placed over an eccentric member having a splined bore. A portion of an endless cable is placed over the thimble. The eccentric member and thimble are placed between a pair of parallel, spaced apart arms of a mounting structure. A splined shaft is inserted through holes in the arms and into the splined bore of the eccentric member to secure the eccentric member to the mounting structure. A threaded nut is placed on a threaded end of the splined shaft. The cable is tensioned by rotating a head portion of the splined shaft 180 degrees, or by a different predetermined value, which places the cable under a predetermined tension. A retaining screw is inserted through one of the mounting structure arms and into a threaded hole in the eccentric member. The system enables a precise degree of tension to be quickly and easily applied to a cable with no risk of accidentally over-tensioning the cable.

21 Claims, 5 Drawing Sheets

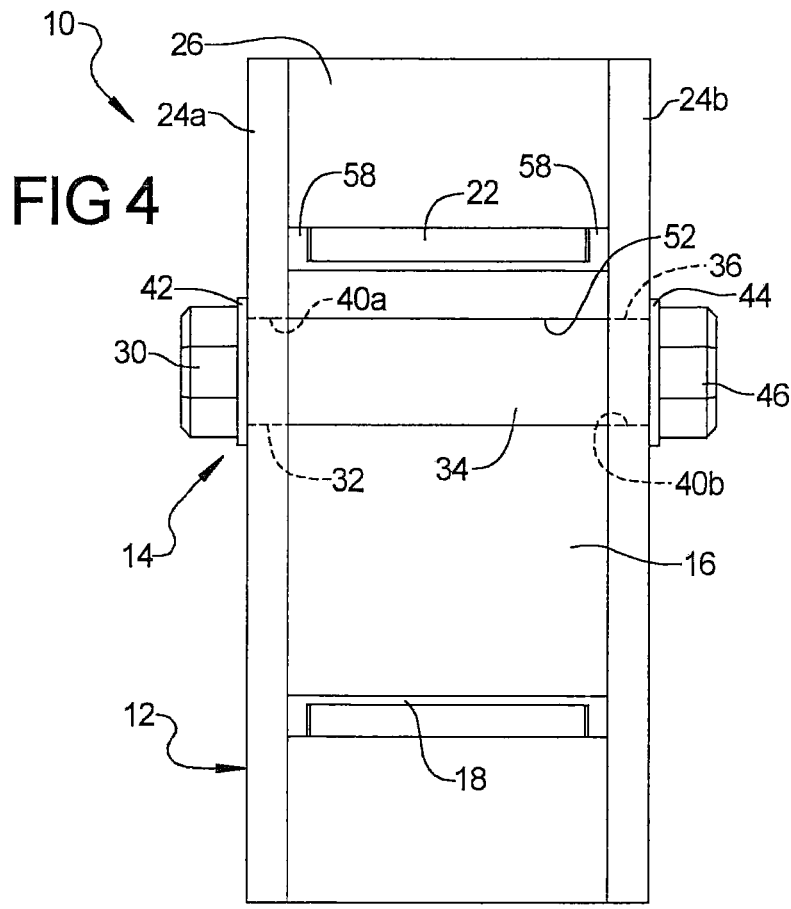
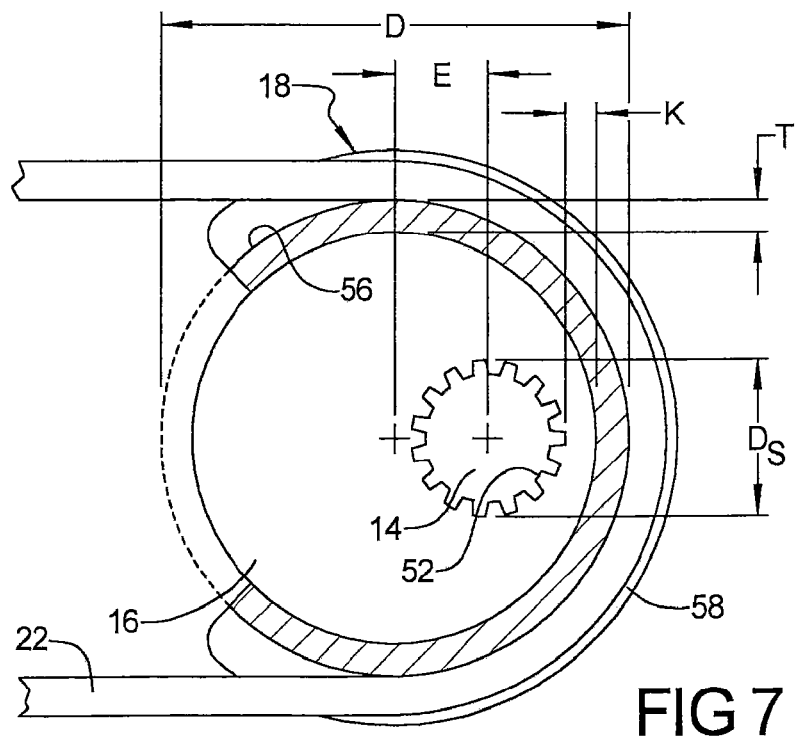

TENSIONING APPARATUS AND METHOD

CROSS-REFERENCE TO RELATED APPLICATIONS

This application is generally related in subject matter to U.S. patent application Ser. No. U.S. Ser. No. 11/332,907 filed 17 Jan. 2006, the disclosure of which is incorporated herein by reference.

FIELD

The present disclosure relates generally to systems and methods for tensioning cables, and more particularly to tensioning systems and methods that provide a compact, efficient means to provide a precise degree of pretension force to a cable.

BACKGROUND

The statements in this section merely provide background information related to the present disclosure and may not constitute prior art.

A cable tensioning system is often needed for use in tensioning high-strength cables of the "endless loop" variety. In essence, these cables consist of two end fittings (often called "thimbles") with many wraps of a single yarn (or a few yarns) around the thimbles forming a cable of essentially unidirectional fiber loops. The single pair (or few pairs) of fiber ends may be tied together or left loose. In the latter case, friction among the fibers is sufficient to prevent the loops from opening up. Such cables can achieve a very high fraction of the native fiber strength and rigidity, making them attractive for applications in which high strength, high rigidity and low weight are important.

The native fiber strength of such cables can be very high compared to the strength of typical structural materials used in both compression and tension. For example, the DuPont Corporation's aramid fiber KEVLAR® has a tension yield strength of 525,000 PSI. Used with a safety margin and a factor for losses at the thimble, its limit load could be as high as 330,000 PSI. This is more than eight times greater than the limit of stress levels of aircraft structure, which is typically around 40,000 PSI. These cable materials also have much greater specific strength than metal used in cables. For instance, at yield, Kevlar has a strength of 525,000 PSI with a density (relative to water) of 1.44. Steel used in cables has a strength of around 300,000 PSI but a density of 7.8. On a pound-for-pound basis, Kevlar is more than nine times as strong as high-strength steel wire. Thus, cable bracing via high-strength fibers can be very attractive when weight is an important concern. However, the use of high-strength synthetic cable demands relatively large termination thimbles to avoid "pinching" the fibers as they wrap around the thimble. This is an important factor that must be addressed in any tensioning system used with such high strength synthetic cables.

It is a characteristic of a cable that it is capable of acting only along its longitudinal axis in tension. In compression, cable simply buckles out of the way and exerts no significant force. Similarly, a cable does not carry significant bending or torsional load; it only works in tension.

Cables are often used as elements in structures to brace or support rigid elements. An alternative to cable bracing is the use of a rigid brace that operates in tension when bracing in one direction and compression when bracing in the opposite direction. Because cable cannot brace in the compression direction, it is typical to use two cables in place of a single rigid brace. These cables are generally set in opposition so that force on the structure in one direction tends to tension only one cable while force in the other direction tends to tension only the other cable.

When set in opposition as described above, it is possible to pre-tension the cables so that both cables experience tension even when there is no external load on the structure. Such pre-tension tends to load other elements of the structure in compression.

Pre-tension of the cables tends to increase the effective rigidity of the bracing. This rigidity may be expressed in terms of inches of deflection-per-pound force exerted or degrees of angular deflection-per-pound of force or foot-pounds of torque. Cable pre-tension tends to increase this rigidity by a factor of two over the range of force during which both cables remain under tension. As the load is increased, a point is reached at which one cable becomes slack. At this point, the bracing rigidity returns to the same value as in an un-pre-tensioned arrangement. From the above, it will be appreciated that it is often desirable to pre-tension bracing cables in order to increase rigidity.

Installation of braces into a structure can pose an additional challenge. In a structure with precise dimensions it may be possible to make a cable that fits the structure perfectly so that it may be installed with no slack and no pre-tension. However, if the cable is slightly shorter than the distance between the mounting points, the cable may be very difficult to install due to the possible rigidity of the structural elements. For this reason, it may be advantageous to make the cable slightly longer than the expected distance and to take up the slack with a tensioning mechanism. Cable slack is very undesirable because it gives zero bracing rigidity to the structure over the load range where both cables are slack. Having cable slack is worse than having no pre-tension on the cable. However, it is not easy or desirable to install a cable that is shorter than the mounting distance. That is, it is not simple or desirable to stretch the cable before assembly so that it is tensioned after installation.

From the above, the following summary can be presented:

the problem is particularly significant when using high-performance bracing cable that is relatively lightweight, strong and rigid;

pre-tensioning of the cable is advantageous because it increases bracing rigidity by eliminating slack and by engaging both cables in the bracing action; and tensioning the cable before installation into the structure is generally not desirable. A corollary to this is that distorting the structure to reduce the distance between mounting points to permit assembly is also generally not desirable.

From the above, it can seen that a suitable mechanism for pre-tensioning a cable is highly desirable. Furthermore, the optimal degree of pre-tensioning that should be applied to a cable is often not straightforward to estimate. In a simple structure with a single load case, it can be shown that a pre-tension level equal to one-half of the limit tension provides extra rigidity over the full range of loads without any increase in the maximum stress levels of the structural components. However, in many structures, several load cases may be applicable. Some of these cases may not directly involve the bracing and in such cases the pre-tensioning of the bracing cables may increase the maximum load on the other components. In such cases, the optimum level of pre-tension may be determined after a comprehensive examination of all load cases with a range of alternative pre-tension levels and bracing cable cross sections. It may be that a lower pretension with a larger cross section (and heavier) cable avoids additional loads on the other components and results in a lighter structure overall while providing the necessary level of rigidity.

Another aspect of the problem is to provide a mechanism for pre-tensioning that provides an accurate level of pre-tensioning. If the pre-tensioning is too little, then bracing rigidity will drop to one-half at too low a load level. This may have adverse consequences on the behavior of the structure including excessive deflection under load or a reduced resonant frequency of the structure. If the level of pre-tensioning is too great the cables and the other structural elements may be overstressed at the limit load. Thus, a mechanism that provides an accurate degree of pre-tension is desired. Furthermore, it would be advantageous for this mechanism to be "fool-proof" in the sense that it's construction makes it difficult for an individual to install incorrectly.

Related to the need for an accurate level of pre-tensioning is the need for a range of pre-tensioning distances. The degree of pretension (in terms of stress level) is directly related to the length of the cable, the elastic modulus of the cable, and the amount of slack built into the cable length. This means that the tensioning mechanism design concept is preferably adaptable to a range of tensioning distances even if each individual tensioning device is designed for a single pre-tension distance.

Different cable brace applications will involve different load levels according to the loads on the structure. Thus, an effective tensioning mechanism would ideally be adaptable to a range of tensioning force and be able to accommodate a range of maximum force levels. Alternatively, if two mechanisms are used on a single cable the pre-tension distance of each mechanism can be cut in half. This may result in a more compact tensioning mechanism. Also, it is desirable for the pre-tensioning mechanism to be easy to install and operate.

With a tensioning mechanism, being compact and lightweight can be of particular importance. Compact size may be desirable in that the physical size of the tensioning mechanism may influence the size and weight of other structural elements; i.e., small size can lead to a compact, lightweight connecting structure. An aspect of this is the need to integrate well with the end thimbles of the cable. These thimbles are generally cylindrical in form with a diameter and length determined by the cable load and the fiber properties. This is described in detail in U.S. patent application Ser. No. 11/332,907, filed 17 Jan. 2006, entitled "Cable Termination with Nested Thimbles". Thus, it will be appreciated that the product of thimble diameter and width is approximately constant for a given maximum load and fiber type. A narrow thimble must be large in diameter and vice versa. For some high-performance synthetic fibers, the thimbles must be unexpectedly large, much larger than for metallic cables. These large thimbles still need to integrate well with the tensioning mechanism.

Various forms of tensioning devices have been developed in attempts to provide mechanisms for applying a pretension to a cable. One such device is the well known turnbuckle. Turnbuckles are commonly used for bracing cables. A tensioning screw is another device used for this purpose. Such a device is shown in FIG. 1. A cable termination can be made in which a screw is used to tension a cable. For example, a U-shaped fitting can capture the cable thimble in its open end. The thimble can be pinned or bolted to the fitting. A half-cylinder block can fill in the bottom of the U-shaped fitting. A screw (or multiple screws) through this half-cylinder and fitting can attach the fitting to fixed structure. Screwing the screw into the fixed structure can also pre-tension the cable. This device is in essence one-half of a turnbuckle.

A Spanish windlass is another type of well known tensioning system. The Spanish windlass is used to tension a loop of cable or rope. It is simply a stick placed within the middle of loop and rotated about the longitudinal axis of the loop. This twists the loop about itself, increasing the path length of the loop and thereby its tension. The Spanish windlass tends to be used in relatively impromptu applications.

Still another type of tension mechanism is an over-center device. Such mechanisms make use of an over-center lever to tension a cable. An hydraulic ram is yet another form of tensioning mechanism. A hydraulic ram that is placed in series with a cable enables a pressure in a cylinder of the ram to exert tension on the cable. This can be controlled so as to provide a specified level of pre-tension force or a specified linear displacement of the cable. Such devices are used on some sailboats to control the tension (length) of the cable between the transom and upper mast.

Still another form of tensioning mechanism is a shaft that extends from an eccentric. Such devices are sometimes used with bicycles in which the pedal crankshaft runs through bearings that are mounted off-center in a cylindrical housing. This housing fits within a shell and may be turned and locked at a range of angular orientations. A variation of angle tends to move the crankshaft fore and aft, providing a variation in the distance between the crank sprocket and the driven sprocket so as to adjust the tension or slack in the chain.

All of the above described, prior-developed tensioning mechanisms have drawbacks, as listed below:

Turnbuckle:
adds at least one major connection by fitting between the structure and the cable end—both ends of the turnbuckle must be attached;
replaces some length of the lightweight cable with the equivalent of an internally threaded (female) cylinder and two externally threaded screws, which adds significant weight;
screw connections in tension require large screws to account for the high thread stresses and high stresses in the core of the threaded portion of the screw; this adds significant weight;
infinite adjustment; it is possible to under or over-tighten a turnbuckle connection.
difficult integration between the turnbuckle and a large cable thimble.

Tensioning Screw:
Heavy; screw connections in tension require large screws to account for the high thread stresses and high stresses in the core of the threaded portion of the screw;
possibly awkward assembly; the fitting tends to shroud the screw head, possibly making it difficult to get a wrench on the screw and to tighten it;
infinite adjustment; it is possible to under-tighten the screw connection.

Spanish Windlass:
unsuited in many applications because it involves twisting the cable, which can impart undesired stress on the cable fibers by altering the relative path lengths and angles of individual fibers in the cable; this can reduce the strength of the cable;
twisting the cable tends to reduce the rigidity of the cable, an undesirable trait;
the windlass "stick" must be fixed to some structure to prevent un-winding; this is likely to require an additional structure for this purpose.
infinite adjustment; it is difficult to know when the correct degree of pre-tension has been achieved; it is easy to under or over-tension the cable.

Over-Center Device:
  difficult to make most over-center devices work with a large cable thimble; the cable and/or the cable thimble tends to conflict with the shaft about which the lever arm rotates.
Hydraulic Ram:
complex and costly.
  a failure in the hydraulic system could result in loss of pre-tension; alternatively, a locking pin could be used to fix the hydraulic piston, but such a pin would need to be large and likely would be heavy.
  typical high-performance hydraulic system pressures are on the order of 5000 PSI; typical cable limit tensions may be greater than 200,000 PSI; as such, the piston diameter would be more than six times as large as the cable diameter if it is to fully pre-tension the cable.
Shaft in an Eccentric:
  the shaft is moved fore and aft relative to the fixed structure and the chain wheel (sprocket) is located on one side (asymmetrically) of the fixed structure; this places asymmetrical (and higher) loads on the structure resulting in a heavier structure and mechanism.

In view of the foregoing, it will be appreciated that there is a need for a robust yet compact tensioning system that is well adapted for use in a variety of applications to apply a pretension force to a high strength cable, and that enables a precise amount of pretension force to be applied to a cable.

SUMMARY

The present disclosure relates to a tensioning apparatus and method that is well suited for applying a pretension force to a cable. In one embodiment the apparatus includes a mounting structure for supporting a shaft. The shaft supports an eccentric member and is keyed to the eccentric member so that rotation of the shaft causes rotation of the eccentric member. In one specific embodiment the shaft has a splined portion and the eccentric member includes a splined bore that engages the splined portion of the shaft. A thimble is placed over an outer surface of the eccentric member and receives an end of a cable.

The eccentric member also includes structure enabling it to be fixedly secured to the mounting structure once the eccentric member is rotated to a desired position to apply a desired degree of pretension force to the cable. In one embodiment the eccentric member includes a threaded bore and the mounting structure includes a hole that enables a retaining screw to be used to hold the eccentric member stationary at a predetermined rotational position relative to the mounting structure.

The apparatus and method does not require lateral movement of the shaft that supports the eccentric member. As such, the apparatus forms a compact yet robust mechanism. The eccentric member can be easily rotated with a suitable tool into the desired position where a predetermined amount of pretension is applied to the cable. A particular advantage of the apparatus is that it is not possible for an individual installing the apparatus to accidentally over tension a cable, since the eccentric is designed to be secured to the mounting structure at a precise orientation relative to the mounting structure.

The apparatus is especially well suited for applications involving cable braced trusses and other structures used in buildings, bridges, aircraft and various other structures.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a cross sectional view through the assembled apparatus of FIG. 1, taken in accordance with section line 4-4 in FIG. 1;

FIG. 7 is a diagram that illustrates various dimensions used for determining a minimum thimble diameter.

DETAILED DESCRIPTION

The following description is merely exemplary in nature and is not intended to limit the present disclosure, its application or uses.

Figure 1:
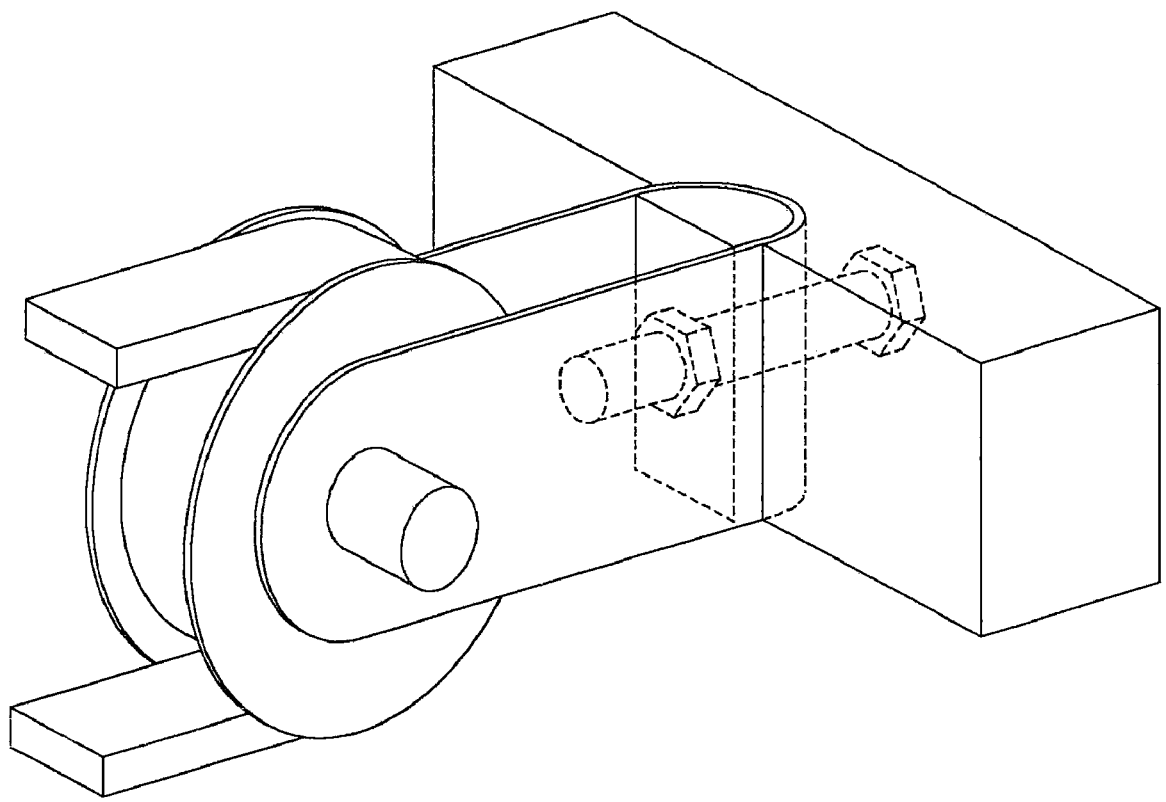
FIG. 1 is a view of a prior art tensioning screw device.
Figure 2:
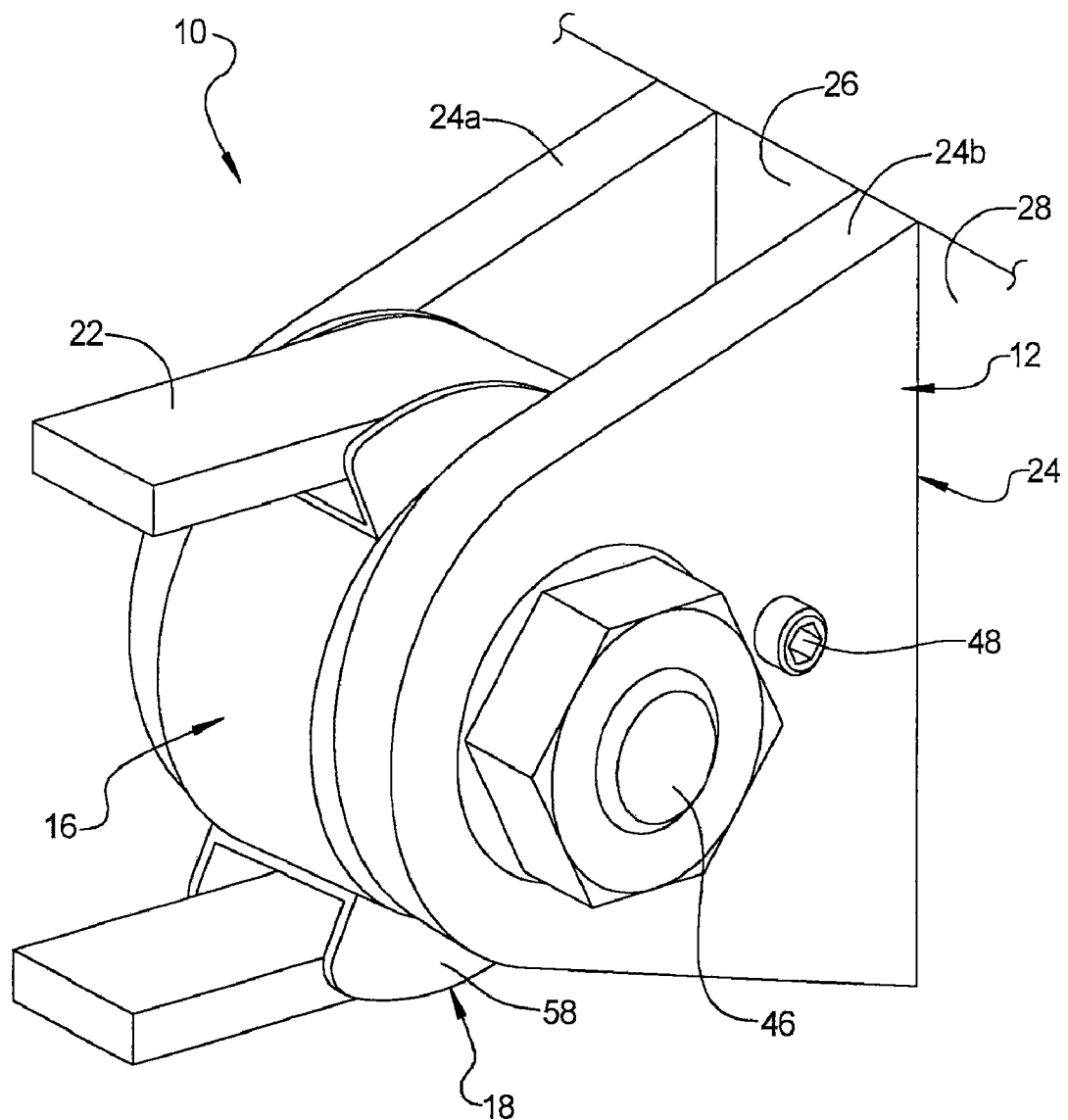
FIG. 2 is a perspective view of a tensioning apparatus in accordance with one embodiment of the present disclosure.
Figure 3:
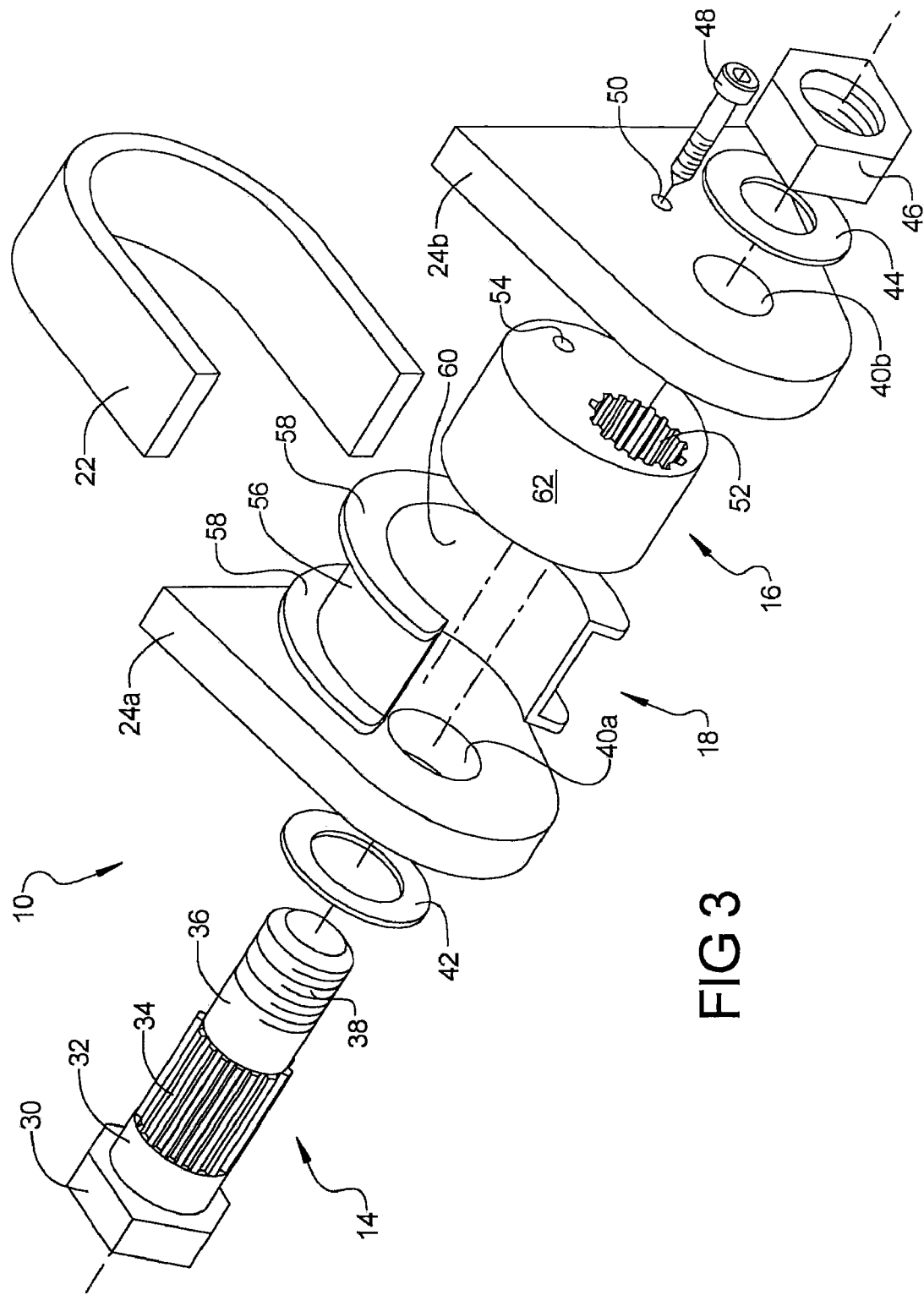
FIG. 3, is an exploded perspective view of the apparatus of FIG. 2.

Referring to FIGS. 2 and 3, a cable tensioning apparatus 10 in accordance with one embodiment of the present disclosure is illustrated. The apparatus 10 generally includes a mounting structure 12, a splined shaft 14, an eccentric member 16 and a thimble 18. A threaded nut 20 may be used to retain the eccentric member 16 at a predetermined rotational position relative to the mounting structure 12, as will be described further in the following paragraphs. In the figures a portion of an endless loop cable 22 is supported on the thimble 18.

The mounting structure 12 may comprise a bracket or any like structure. The mounting structure 12 in this embodiment includes a pair of arms 24a,24b and a base portion 26. The base portion 26 is secured to an external structure 28 that forms, for example, a wall, a mast, a tower, a node of a truss structure, a beam, a bulkhead, or any other structure that might be suitable to secure the mounting structure 12 to. The mounting structure 12 may be formed from any suitable material, but typically will be formed from structural metals such as steel, titanium, aluminum, or from structural composite materials such as carbon fiber/epoxy.

Referring to FIG. 3, the splined shaft 14 includes a head portion 30, a first bearing portion 32, a splined portion 34, a second bearing portion 36 and a threaded portion 38. Arms 24a,24b include openings 40a,40b respectively, with each having a sufficient diameter to permit the bearing portions 32,36, the splined portion 34 and the threaded portion 38 to project through the openings 40a,40b. A first washer 42 may be disposed between the head portion 30 and arm 24a, and a second washer 44 may be positioned between a threaded nut 46 that engages the threaded portion 38 of the splined shaft 14, and the other arm 24b, when the apparatus 10 is assembled to the mounting structure 12. A threaded retaining screw 48 may be inserted through a hole 50 in arm 24b to secure the eccentric member 16 against rotational movement, as will be explained more fully in the following paragraphs.

The eccentric member 16 includes a splined bore 52 that is formed eccentrically relative to an axial center of the eccentric member. A smaller, threaded bore 54 is formed eccentrically at a predetermined location for receiving the threaded retaining screw 48 when the screw 48 is inserted through the hole 50. This secures the eccentric member 16 stationary relative to the mounting structure 12 after the apparatus is fully assembled. The splined bore 52 has a diameter that enables the splined portion 34 of the splined shaft 14 to engage therewith so that rotation of the splined shaft 14 causes a corresponding rotation of the eccentric member 14. The outer diameter of the eccentric member 16 may vary significantly depending on the particular application in which the apparatus 10 is used, and particularly with the type of cable 22 to which the apparatus 10 is applying a tension force. It is anticipated that in most applications, the diameter of the eccentric member 16 will typically range from about 1-8 inches (25.4-203.2 mm). Similarly, the degree of eccentricity of the splined bore 52 may be selected to meet the needs of a specific application. The eccentric member 16 may also be made from a variety of materials, but one material that is particularly well suited for use is high strength steel. Other suitable materials may comprise titanium and aluminum.

Referring further to FIG. 3, the thimble 18 has a base portion 56 and flanges 58, and in this example forms a circumferential component that extends about an arc greater than 180 degrees. The radius of curvature of an inner surface 60 of the thimble 18 is just slightly greater than an outer diameter of the eccentric member 16 so that inner surface 60 of the thimble is a slip fit over an outer surface 62 of the eccentric member 16 with little play. It will be appreciated, however, that the arc that the thimble 18 covers could be greater than 180 degrees or even less than 180 degrees. The thimble 18 could also be formed as a complete, circular component having an opening adapted to be slip-fit over the outer surface 62 of the eccentric member 16. It is anticipated that for most applications, an arc of at least about 180 degrees will be preferred.

The thimble 18 may be made from steel, aluminum or even high strength plastic. During manufacture, the endless loop cable 22 is typically formed by wrapping a length of fiber many times around two flanged thimbles (e.g., a pair of thimbles such as thimble 18). The flanged thimbles 18 become an integral part of the cable 22 that both transfers the cable 22 load to the eccentric member 16 and prevents the fibers making up the cable 22 from spilling off the sides of the thimbles 18 when loaded. The spacing of the flanges of the thimble, in this case flanges 58 of thimble 18, defines the width of the cable 22. The depth of the flanges 58 is preferably deep enough to constrain all of the fibers that are making up the cable 22, possibly with some margin to aid in manufacture and to assure that all of the fibers are securely wrapped around the thimble 18. Alternatively, the flanges 58 may be omitted. In that case, a temporary tool may be used in place of the flanges 58 to guide the fibers during wrapping. When wrapping is complete, the fibers may be impregnated with resin that is then cured. In this arrangement, the cured resin prevents the fibers from slipping off to the side under load. Note that the inner portion of the thimble 18 remains in this arrangement and that it becomes an integral part of the cable assembly.

To assemble the apparatus 10 when the endless cable 22 is being secured and tensioned via the apparatus 10, the thimble/cable assembly 18,22 is first placed over the eccentric member 16. The arrangement of the thimble/cable assembly 18,22 is such that cable 22 rests on the base portion 56 and between the flanges 58. The eccentric member 16 is then positioned between the arms 24a and 24b. To ease assembly, the eccentric member 16 may be oriented so that there is a small degree of slack in the cable 22. In this instance, that means that the eccentric member 16 would be positioned so that the threaded bore 54 in the eccentric member is disposed about 180 degrees from the hole 50, relative to rotation about the hole 40b. The splined shaft 14 is inserted through the washer 42, through the hole 40a in arm 24a, through the splined bore 52, through the hole 40b in arm 24b and through the washer 44. This places bearing surfaces 32 and 36 on the splined shaft 14 within the holes 40a and 40b respectively. The threaded nut 46 is then threaded onto the threaded end 38 of the splined shaft 14 so that the splined shaft 14 secures the eccentric member 16 securely but not so tight that rotation of the splined shaft 14 is impeded. The assembled apparatus 10 is shown in cross section in FIG. 4.

Figure 5:
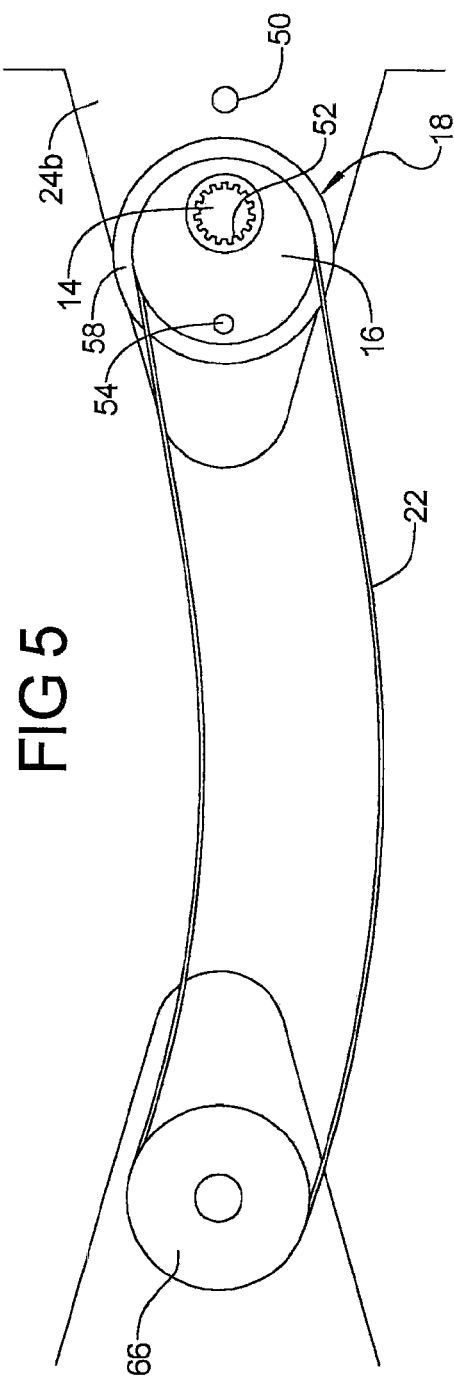
FIG. 5 is a simplified side view illustrating the tensioning apparatus of FIG. 1 being used to support one portion of an endless cable, with the eccentric member in the position allowing maximum slack of the cable.

Once the basic assembly operations described above are completed the apparatus 10 may be used to apply a predetermined degree of pre-tension force to the cable 22. FIG. 5 illustrates the apparatus 10 being used to support the cable 22 at one end, while the opposite end of the cable is looped over a fixed thimble 66. Of course, a pair of the apparatuses 10 could be employed to support the opposite ends, and such a configuration would provide a significantly greater variation in the magnitude of pre-tensioning force that can be applied to the cable. It is anticipated that in many applications, however, the use of a single apparatus 10 will be sufficient to provide the needed degree of pretension to the cable 22.

Figure 6:
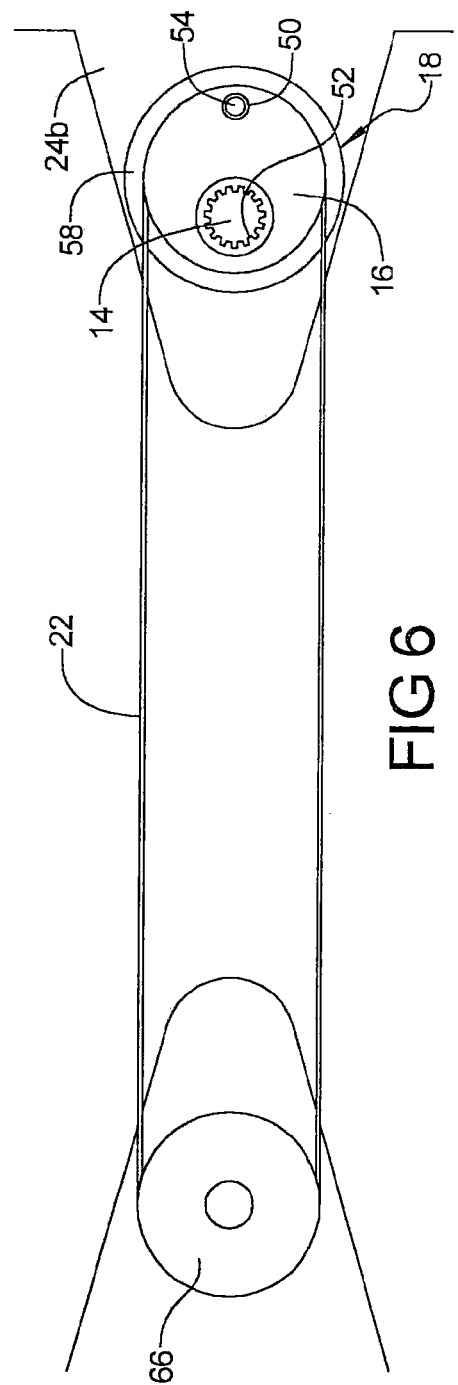
FIG. 6 illustrates the apparatus after the eccentric member has been rotated 180 degrees to fully pre-tension the cable.

Referring further to FIGS. 3, 5 and 6, tensioning of the cable 22 is accomplished by using a suitable tool, for example a pair of pliers, a socket wrench, open end wrench, etc., to rotate the head portion 30 of the splined shaft 14. Rotating the head portion 30 180 degrees moves the cable thimble 18 laterally a precise distance equal to twice the eccentricity of the eccentric member 16 relative to the splined shaft 14 axis.

The 180 degrees of rotation of the splined shaft 14 places the threaded bore 54 in the eccentric member 16 in alignment with the hole 50 in the arm 24b. This takes up the slack in the cable 22 (shown in FIG. 5) and places the cable under the desired degree of tension (shown in FIG. 6). Also, at the 180-degree position (FIG. 6), the cable 22 tension vector is directed through the splined shaft 14 axis so that there is no tendency for the eccentric member 16 to turn as a result of cable tension. The apparatus 10 is nearly symmetrical about the center plane that is perpendicular to the splined shaft 14 axis. This places the splined shaft 14 in double shear with an equal load on both bearings portions 32 and 36, and results in an equal load on both arms 24a and 24b of the mounting structure 12. A slight difference in the diameters of the bores 40a and 40b gives a slightly higher pressure on the smaller bore 40b.

While the eccentric member 16 is being held in the position shown in FIG. 6, the retaining screw 48 is threaded into the threaded bore 54 to secure the eccentric member 16 against rotational movement relative to the mounting structure 12. The cable 22 is now held securely with the predetermined degree of tension applied thereto. Alternatively, the threaded bore 54 could comprise a through bore, and a threaded (or unthreaded) hole could be formed in the arm 24a. A long set screw could be inserted completely through the eccentric member 16 and threaded into the hole in the arm portion 24a. Alternatively, a cotter pin or a length of retaining wire (e.g., steel wire) could be inserted through the through bore. Finally, the threaded nut 46 is tightened. This prevents the threaded nut 46 from working loose over time. Also, by tightening the threaded nut 46 at the end of the assembly procedure, this serves to help stabilize the arms 24a and 24b and generally to keep all of the components of the apparatus 10 clamped securely together between the arms 24a and 24b.

It will also be appreciated that a lubricant or even bearings could be employed to reduce friction between the eccentric member 16 and the thimble 18. Friction between these two components may be an important consideration in some configurations during the tensioning process. Solutions could include lubrication with liquid grease, or the use of a thin, low-friction coating (such as DuPont TEFLON® material (polytetrafluoroethylene (PTFE)) on the outer surface 62 of the eccentric member 16 and/or the inner surface 60 of the thimble 18. Still another possible solution could include the use of a bearing, for example a needle bearing, between the surfaces 60 and 62. If an actual bearing is used, a needle bearing (i.e., roller bearing with small diameter rollers) may be preferable because this type of bearing provides bearing strength with a small profile.

A particular advantage of the apparatus 10 is that it is impossible for a worker to over-tension the cable 22 during the above described installation procedure. Since the eccentric member 16 can only be secured at one position relative to the arm 24b, there is no chance of the worker inadvertently securing the eccentric member 16 at a rotational position that applies too great or too little tension on the cable 22. However, if the apparatus 10 is required to be used with different cables requiring different pretension forces, it is within the realm of the present disclosure that the eccentric member 16 be provided with a plurality of threaded, slightly spaced apart holes 54, with the precise location of each one of the threaded holes being predetermined to apply a specific pretension force to the cable that is being supported by the apparatus 10. An alternative method of achieving variable tension forces would be to provide two or more holes 50 that are slightly spaced apart at predetermined angular locations on arm 24b. In this embodiment, the particular hole 50 that the retaining screw 48 is inserted through determines the precise rotational position that the eccentric member 16 is held in, and thus the precise amount of pretension force that is applied to the cable. For example, by locating additional holes 50 at displacements of 10, 20 and 30 degrees about the splined shaft 14 axis, it would be possible to secure the eccentric member 16 at intermediate angular positions of 150, 160 and 170 degrees, as well as the 180 degree position illustrated in FIG. 6. This would give tensioning distances of 93.3%, 97.0%, 99.2% and 100% of the full angular distance to the hole 50 shown in FIG. 6. Still further, by including a second hole 50 in the arm 24b, offset by 5.0 degrees about the splined shaft 14 axis, it would be possible to obtain intermediate angles of 145, 155, 165 and 175 degrees, yielding a corresponding refinement in tensioning distance (and tensioning force). Use of these additional angles would put a load on the retaining screw 48, the mounting structure 12 and the eccentric member 16 so that these components may require increased size and weight. The apparatus 10 is equally well adapted for use with nested thimble devices such as disclosed in co-pending U.S. patent application Ser. No. 11/332,907, owned by the The Boeing Company.

Several relationships may be observed in determining the geometry of the apparatus 10. Initially, the cable cross section area is set by the limit load divided by the cable 22 material limit stress, times a factor accounting for strength loss at the thimble 18. This loss is typically determined by the cable 22 depth (at the thimble 18) to the thimble 18 diameter ratio.

The thimble 18 diameter and width must also support the cable 22 cross section area. The cable 22 depth at the thimble 18 (distance from inner to outer fiber) is typically limited to a fraction of the thimble diameter according to the acceptable strength reduction. For instance, a typical thimble is about 10 times the diameter of the thickness of the cable 22. The thickness of the cable 22 is determined by the width of the thimble and the cable cross section area.

Another factor that sets the minimum thimble 18 diameter is the need for the splined shaft 14 to pass through the eccentric member 16 without extending beyond the cylindrical surface of the eccentric member. With reference to FIG. 7 and Equation 1 below, this may be expressed as:

$$D_t = 2e + D_s + 2k + 2t \qquad \text{Equation 1}$$

where:
$D_t$=diameter of the thimble 18 (the surface on which the cable 22 presses) in inches;
e=eccentricity in inches;
$D_s$=diameter of the splined shaft 14 at the outer face of the splined portion 34;
k=the spacing between the outer face of the splined portion 34 and the closest surface of the eccentric member 16 and;
t=thickness of the thimble 18 between the surface on which the cable 22 presses ($D_t$) and the inner race of the thimble 18.

According to Equation 1 above, the minimum thimble 18 diameter may be set in part by the eccentricity of the eccentric member 16. Where the eccentricity is large, the thimble 18 must be large in diameter. However, according to the relations developed in U.S. patent application Ser. No. 11/332,907, a large thimble diameter is compatible with a narrow thimble width. Thus, some of the extra bulk and weight of a large thimble diameter is offset by a narrower width.

Also, Equation 1 above defines a minimum thimble 18 diameter. Associated with this diameter is a minimum width. If the thimble 18 diameter is increased, the width can be decreased. In some cases the optimum solution may be a thimble that is larger in diameter than the minimum due to the offsetting benefit of being narrower.

With regard to thimble 18 width, a chosen thimble diameter determines cable 22 depth. The thimble 18 width is then chosen to give the necessary cable 22 cross section area. Note that "thimble width" refers to the width between the flanges 58 of the thimble 18.

The small bearing portion 36 diameter must be equal to or larger than the value that gives the limit shear stress of the splined shaft 14 under limit cable tension load. The small bearing portion 36 diameter must also be large enough that the tensioning torque applied by the splined shaft 36 via the splines of the splined portion 34 to the eccentric member 16 is transferred without shearing the splines from the splined shaft 14 or the eccentric member 16. Other splined shaft 14 stresses such as bending must also be considered.

The diameter of the larger bearing portion 32 must be larger than the small bearing portion 36 diameter by at least twice the depth of the splines of the splined shaft 14. The larger bearing portion 32 diameter may also be set by torsional stress in the splined shaft 14 that results from tensioning the cable 22.

The thickness of the arm portion 24b with the smaller bearing hole 40b may be set to achieve an acceptable bearing stress from the small bearing portion 36 at a desired limit load. The thickness of the arm portion 24a with the larger bearing hole 40a may be the same as the other arm portion 24b or may be set to achieve an acceptable bearing stress from the larger bearing portion 32 of the splined shaft 14 at the desired limit load.

The spline depth and count for the splined portion 34 must also provide an acceptable pressure loading on the faces of the splines when the cable 22 is tensioned. Deeper or more numerous splines reduce the pressure load.

The distance between the splined shaft 14 axis and the axis of the splined bore 52 determines how far the cable thimble 18 moves when the splined shaft 14 is rotated 180 degrees, namely twice the eccentricity. The amount of eccentricity required is defined by Equation 2 below:

$$e=LF/2AE+S/2 \quad \text{Equation 2}$$

where:
e=eccentricity in inches;
L=length of cable 22 in inches;
F=desired pre-tension force in cable 22 in pounds;
A=cable 22 cross section area in square inches;
E=modulus of elasticity of cable 22 in pounds per square inch; and
S=slack in cable 22, in inches, before pre-tensioning.

Equation 3 below defines pre-tensioning torque (assuming no friction):

$$T=EA/L*(e\sin(X))(e-e\cos(X)-S) \quad \text{Equation 3}$$

where::
T=pre-tensioning torque in inch-pounds; and
X=angle of splined shaft 14 and eccentric member 16 where the starting angle is zero (aligned with cable 22 axis), in degrees.

The angle at which torque (with no friction) is maximum is the angle that satisfies the Equation 4 below:

$$\cos(X)*(2e\cos(X)+S-e)=e \quad \text{Equation 4}$$

When S=0, maximum torque is reached at 120 degrees.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A tensioning apparatus for tensioning an element, the apparatus comprising:
   an eccentric member having a bore extending through a thickness of said eccentric member and that is offset from an axial center of the eccentric member;
   a shaft positioned to extend through the first bore to support the eccentric member thereon, the shaft further being coupled to the eccentric member to prevent rotation of the eccentric member on the shaft;
   a thimble placed over said eccentric member for supporting a portion of an element thereover; and
   a mounting structure for supporting said shaft.

2. The apparatus of claim 1, wherein:
   said eccentric member includes a hole that is offset from said bore, and said mounting structure includes a hole; and
   wherein said apparatus includes a retaining element for engaging said holes in said eccentric member and said mounting structure to prevent rotational movement of said eccentric member once said eccentric member is rotationally positioned so as to apply a desired tension to said element.

3. The apparatus of claim 2, wherein:
   said retaining element comprises a threaded retaining screw; and
   said hole in said eccentric member comprises a threaded hole.

4. The apparatus of claim 3, wherein said threaded hole is formed in said eccentric member at a position corresponding to a predetermined rotational position of said eccentric member, to permit a predetermined degree of tension to be maintained on said element by said eccentric member.

5. The apparatus of claim 4, wherein a plurality of threaded holes are formed in said eccentric member to enable selected degrees of tensioning force to be applied to said element when said threaded retaining screw is used to secure said eccentric member to said mounting structure.

6. The apparatus of claim 1, wherein said shaft includes a plurality of splines, and said bore comprises a splined bore for engaging with the splines of the shaft.

7. The apparatus of claim 1, wherein said mounting structure comprises a bracket having a pair of arms, each of said arms including a hole for receiving said shaft therethrough.

8. The apparatus of claim 1, wherein said thimble comprises a semi-circular component adapted to cover at least about a 180 degree portion of an outer surface of said eccentric member.

9. The apparatus of claim 1, wherein said thimble includes a pair of generally parallel, spaced apart flanges for laterally restraining said element.

10. The apparatus of claim 1, further comprising a retaining element for securing the eccentric member stationary.

11. A tensioning apparatus for tensioning cables, the apparatus comprising:
    an eccentric member having a splined bore and a retaining bore;
    the splined bore extending through a thickness of said eccentric member and being offset from an axial center of the eccentric member;
    a splined shaft positioned to extend through the splined bore to key the eccentric member thereto;
    a thimble placed over said eccentric member for supporting a portion of a cable thereover;
    a mounting structure for supporting said shaft; and
    a retaining element for engaging said retaining bore and securing said eccentric stationary relative to said mounting structure.

12. The apparatus of claim 11, wherein said mounting structure comprises a mounting bracket having a pair of arms, each of said arms having a hole for receiving said splined shaft therethrough.

13. The apparatus of claim 11, wherein said retaining element comprises a threaded retaining element, and said retaining bore comprises a threaded retaining bore.

14. The apparatus of claim 13, further comprising a plurality of said threaded retaining bores formed in said eccentric member for enabling said eccentric member to be secured relative to said mounting structure in a plurality of positions, so that said eccentric member is able to apply one of a plurality of different predetermined tension forces to said cable.

15. The apparatus of claim 11, wherein said splined shaft includes a threaded portion; and
    said apparatus further including a threaded nut for engaging said threaded portion to secure said splined shaft to said mounting structure.

16. The apparatus of claim 11, further comprising a plurality of thimbles for supporting a plurality of independent cables on said eccentric member.

17. The apparatus of claim 11, wherein said thimble includes a pair of generally parallel, spaced apart flanges to restrain lateral movement of said cable.

18. The apparatus of claim 11, wherein said thimble comprises a circumferential shape that covers at least about a 180 degree arc of an outer surface of said eccentric member.

19. A method for tensioning a cable, comprising:
- disposing a thimble on an outer surface of an eccentric member;
- disposing a portion of a cable over said thimble;
- supporting the eccentric member by a shaft so that the eccentric member is keyed to the shaft;
- supporting the shaft for rotational movement from a mounting structure;
- rotating the shaft to cause the eccentric member to be rotated to a position where a desired degree of tension is applied to said cable; and
- securing the eccentric member against further rotation.

20. The method of claim 19, wherein supporting the eccentric member to a shaft so that the eccentric member is keyed to the shaft comprises using a splined shaft and a splined bore formed in the eccentric member, the splined shaft and the splined bore engaging together when the eccentric member is placed on the splined shaft.

21. The method of claim 19, wherein securing the eccentric member comprises securing the eccentric member to the mounting structure by using a threaded bore formed in said eccentric member, and a threaded retaining screw, the threaded retaining screw being positioned through a hole in said mounting structure and engaging within said threaded bore in said eccentric member.

* * * * *